(12) United States Patent
Bothwell

(10) Patent No.: US 7,069,258 B1
(45) Date of Patent: Jun. 27, 2006

(54) WEATHER PREDICTION METHOD FOR FORECASTING SELECTED EVENTS

(76) Inventor: Phillip D. Bothwell, 4171 Lake Front Dr., Norman, OK (US) 73072

(*) Notice: Subject to any disclaimer, the term of this patent is extended or adjusted under 35 U.S.C. 154(b) by 454 days.

(21) Appl. No.: 10/672,598

(22) Filed: Sep. 26, 2003

Related U.S. Application Data

(60) Provisional application No. 60/413,936, filed on Sep. 26, 2002.

(51) Int. Cl.
*G06N 5/00* (2006.01)

(52) U.S. Cl. .............................. 706/21; 706/12; 706/15

(58) Field of Classification Search .................. 706/21, 706/12; 702/189
See application file for complete search history.

(56) References Cited

U.S. PATENT DOCUMENTS

| | | | |
|---|---|---|---|
| 5,140,523 A | 8/1992 | Frankel et al. | |
| 6,405,134 B1 | 6/2002 | Smith et al. | |
| 6,424,917 B1 | 7/2002 | Kalkstein et al. | |
| 6,529,890 B1 | 3/2003 | Pandit et al. | |
| 6,546,378 B1* | 4/2003 | Cook | 706/12 |
| 6,988,056 B1* | 1/2006 | Cook | 702/189 |

OTHER PUBLICATIONS

Basak, et al., Weather Data Mining Using Independent Component Analysis, Journal of Machine Learning Research, vol. 5, (2004) pp. 239-253.*

"Statistical Methods in the Atmospheric Sciences" by Daniel S. Wilks, Academic Press, San Diego, CA, 1995, vol. 59 in the International Geophysics Series, ISBN 0-12-751965-3.

* cited by examiner

*Primary Examiner*—Wilbert L. Starks, Jr.
(74) *Attorney, Agent, or Firm*—Doerner Saunders, Daniel & Anderson, LLP; James F. Harvey, III

(57) ABSTRACT

The invention provides methods, systems, and computer program products for short term probability forecasting of selected weather-related events. These embodiments are adaptable for any geographical region that can be identified and for which a reasonable number of data points exist. The inventive method uses a data set of n observations of m parameters, where the parameters may be statistically correlated. A Principal Component Analysis may be performed, with the data set as input, to provide a reduced set of principal components that are uncorrelated and account for most of the variance in the input data set. An orthogonal transformation may be performed on the reduced set of principal components to provide a rotated set of principal components that are aligned with the corresponding parameters in the input data set. Finally a logistic regression may be performed on the rotated set of principal components to derive an S-shaped predictive equation for the probability of a binary weather-related event of interest. An illustrative embodiment of the invention is given for forecasting the probability for the number of lightning flashes exceeding a selected value, for the western United States climatological area.

16 Claims, 6 Drawing Sheets

WEATHER PREDICTION METHOD FOR FORECASTING SELECTED EVENTS

CROSS-REFERENCES TO RELATED APPLICATIONS

The present patent application claims the benefit of the filing date of U.S. Provisional Patent Application No. 60/413,936, filed Sep. 26, 2002, and entitled "Weather Prediction Method for Forecasting Selected Events".

STATEMENT REGARDING FEDERALLY SPONSORED RESEARCH OR DEVELOPMENT

This invention was made in the performance of work by an inventor employed by the U.S. Government. The United States Government may have certain rights to this invention and a right to use any software products developed thereunder. Under authority of 35 U.S.C. §205, Federal agencies may withhold any information pertaining to this invention from the public for a reasonable time in order for a patent application to be filed. Furthermore, Federal agencies shall not be required to release copies of any software that is part of this invention.

FIELD OF THE INVENTION

The present invention relates to the area of weather forecasting and modeling, and more particularly, to methods, systems, and computer program products for a weather prediction system that will produce short term probability forecasts for the occurrence of weather events of interest.

BACKGROUND OF THE INVENTION

The weather has a profound effect on the personal and economic lives of people. Its pervasiveness affects various decisions made by individuals on how to order their affairs, optimize economic activity, and plan for future events. Different weather events have different significance, depending upon the activity involved. For example, lightning is a weather event that is known to be responsible for deaths and injuries, forest fires, personal and business property losses, and airline delays. The ability to predict the probability of lightning strikes is of great importance since it allows informed decisions to be made and proactive measures to be taken, in order to mitigate the negative economic and human impact resulting from these events. For example, forest fire fighters might be dispatched to areas with high probability of lightning strikes so that they could rapidly handle any fire that might be caused by the lightning strikes. The same scenario would hold true for the prepositioning of repair crews and equipment for electrical power outages caused by lightning strikes. Airlines would be able to better schedule and reroute flights to accommodate adverse circumstances caused by lightning strikes.

Similarly, all other weather-related events, such as snowfall, heavy rain and flooding, large hail, damaging wind, and tornadoes, may have different but equally significant affects on various activities, human and economic. Many resources have been devoted to improving the ways in which the probability of occurrence of these weather-related events can be forecast. In order to forecast such weather-related events, data must be collected and analyzed on a real-time basis. The data collection may produce an enormous database that may exhibit little uniformity as to physical spacing, accuracy, and time sequencing of the measurements. The accuracy and extent of these data may vary from region to region depending upon the facilities available and the importance of having an accurate forecast to those personnel in the region.

Data must be obtained from which to forecast the probability of weather events for a given region. Currently, the Rapid Update Cycle 2 (RUC2) model is one method used for measuring the atmosphere across the United States and providing a useful data set for prediction of weather events. Becoming operational in 1998, the RUC2 model represented the first time that an hourly, 3-dimensional data set became available. It contains the parameters necessary for evaluating the potential for convection as well as heavy snow, rain, severe weather or any other selected weather event, i.e. pressure, temperature, moisture, and wind parameters. Another such model is the ETA Model, one of the operational numerical forecast models run at the National Centers for Environmental Prediction (NCEP). The ETA model is run four times daily, with forecast output out to 84 hours. Yet another model under development is the Weather Research and Forecasting (WRF) model.

There have been numerous methods developed for predicting weather-related events. One recent effort at lightning prediction for the zero to three-hour period is the System for Convection Analysis and Nowcasting (SCAN; Smith et al. 1998). This technique is an extrapolative-statistical method based on three years of lightning, radar, and satellite developmental data. The algorithms use extrapolated forecasts of radar reflectivity, satellite-estimated cloud-top temperatures, and current lightning strike rates. However, these algorithms do not extend very far into the future because they rely so heavily on the extrapolation of current conditions. They also are unable to predict when and where new storms will develop. With the exception of these extrapolative forecasts, no short-term (0 to 6 hour) lightning forecasts are in operational use. In addition, previous attempts, using Model Output Statistics or MOS, have tied predictive equations to specific models, which cannot change as the models themselves change and improve. Other similar methods are given according to U.S. Pat. No. 6,405,134, to Smith, entitled "Method and Apparatus for Predicting Lightning Threats Based on Radar and Temperature Data", that provides forecasts of one hour or less.

While sophisticated computer models predict many surface parameters, such as surface wind (10 meter), surface temperature, and dew point (2 meter), other important quantities are not forecast directly. Fields such as amount of cloud cover; ceiling; visibility; probability and type of precipitation; thunderstorm probability; and severe thunderstorm probability are not explicitly predicted by most models. Two basic methodologies have been used to compute fields not specifically forecast by a model. These are known in the art as the Model Output Statistics (MOS) and the Perfect Prog (prognosis) methodologies.

According to the Perfect Prog methodology, a statistical relationship is developed between the variable to be estimated and selected variables which can be forecast by a model. The predictors and predictand are observed quantities in the developmental sample. This relationship is applied using the output fields from the forecast models as predictors to estimate the predictand, treating the model forecast as a perfect prognosis. As improvements to the model are made, forecasts of the predictors should improve with corresponding improvement of the Perfect Prog forecasts.

According to the MOS methodology, a statistical relationship is determined between the predictand and the predictors from a numerical model at a predetermined projection time. MOS equations in the past have been able to out-perform a Perfect Prog approach because they take into account model biases and the decline in the model accuracy with increasing forecast projection. The most serious drawback to the MOS methodology, however, is that it requires a stable numerical model. Given the rate with which changes and improvements are made to today's models, it is doubtful that any model will remain static long enough to develop new MOS equations. Alternatively, the use of the MOS methodology requires the newer version of any model to be "rerun" on a minimum of one year (and usually two to three years) of model output data, which may require expenditure of extensive data collection and computational resources.

Because today's complex computer forecast models change more frequently than those of the past, recent research in forecasting weather-related events has not been transferred to the MOS statistical forecast methodology. Other MOS-based statistical forecasts have ended when the particular model they were based upon was discontinued (e.g., the Limited area Fine Mesh (LFM) model). MOS equations derived from the older models such as the Nested Grid Model (NGM) have not been updated since the NGM code was "frozen" in 1991.

The basic problem is one of data compression. In other words, vast amounts of historical and real time data are now available through various models. So much data is available at different levels and times that it is often difficult to reduce and/or compress the data in a way that is meaningful for the particular weather-related event of interest. What is needed is an improved statistical prediction system for more accurately predicting the occurrence of selected weather events; for reducing or compressing the data by identifying meaningful parameters that are pertinent to the weather-related event being examined; for producing forecasts that bridge the existing gap between extrapolative systems and model-based systems by using both analyses and model forecasts; and for improving the general understanding of environmental characteristics which support the significant weather events

SUMMARY OF THE INVENTION

An object of the present invention is to provide a prediction system that will rapidly produce probability forecasts of selected weather events of interest from a set of predictors that account for a significant fraction of the known variance.

Another object of the present invention is to provide a system that is able to use input data provided by either Perfect Prog or MOS methodologies.

Yet another object of the present invention is to develop a reduced set of uncorrelated predictors from the available predictor set, for a given geographical area, that more accurately forecasts selected weather events than heretofore.

Yet another object of the present invention is to develop predictive equations according to the Perfect Prog methodology that can be applied to the ETA model, the RUC2 model, the Weather Research and Forecasting (WRF) model, or other forecast models.

Yet another object of the present invention is to develop a weather variable prediction system that will provide forecasts for any selected type of weather event.

Yet another object of the present invention is to provide a prediction system that will produce three-hour grid point probability forecasts of cloud-to-ground lightning, where the probability forecast assigns a probability of whether or not the lightning flashes occurring per hour is greater than a selected threshold value.

Yet another object of the present invention is to provide a set of lightning climatological predictors that contain sufficient detail to represent for a selected weather-related event, the diurnal trends as well as intra-seasonal trends.

Yet another object of the present invention is, for a given geographical area, to develop a set of predictive equations for lightning that can be applied to either observed gridded data (i.e. model analyses) or forecast data.

To achieve the foregoing objects, and in accordance with the purpose of the invention as broadly described herein, the present invention provides methods, systems, and computer program products for a weather prediction system that will produce probability forecasts of at least an hour for selected weather events. This method preferably comprises the following steps (not necessarily in the given order): defining a predetermined geographical area in terms of a regular grid, developing a data set of predictors consisting of a time series of measurements of a pre-defined collection of physical attributes, correlating the predictors to the predictands (to find the strongest correlation to predictands among the variables), performing Principal Component Analysis (PCA) to determine a much smaller, distinctive physical set of predictors to serve as new predictors for regression, and performing a logistic regression to determine the predictive equations for lightning occurrence.

In an alternative embodiment, the steps of defining the geographical area in terms of a linear grid and developing a data set consisting of a time series of measurements of a pre-defined collection of physical attributes may be combined into the single step of inputting a data set obtained from any calculated gridded analysis of the data set and/or a model forecast.

In another alternative embodiment, the system may be used to forecast the occurrence of any selected type of weather event, for example, the probability of heavy snow (such as 18 inches or more), the probability of fog (such as ¼ mile visibility or less), probability of hail (such as 2 inches in diameter or greater), or the probability of a tornado (such as strength F2 or greater). The range of possible weather events that can be forecast by the system is only limited by the types of physical measurements of weather-related data that can be made that would reasonably be related to the weather event in question.

The present invention will now be described with reference to the following drawings, in which like reference numbers denote the same element throughout. These and other features, aspects, and advantages of the present invention will become better understood with reference to the following drawings, description, and claims. These objects should be construed to be merely illustrative of some of the more prominent features and applications of the present invention. Many other beneficial results can be attained by applying the disclosed invention in a different manner or by modifying the invention within the scope of the disclosure.

DETAILED DESCRIPTION OF THE INVENTION

Figure 1:
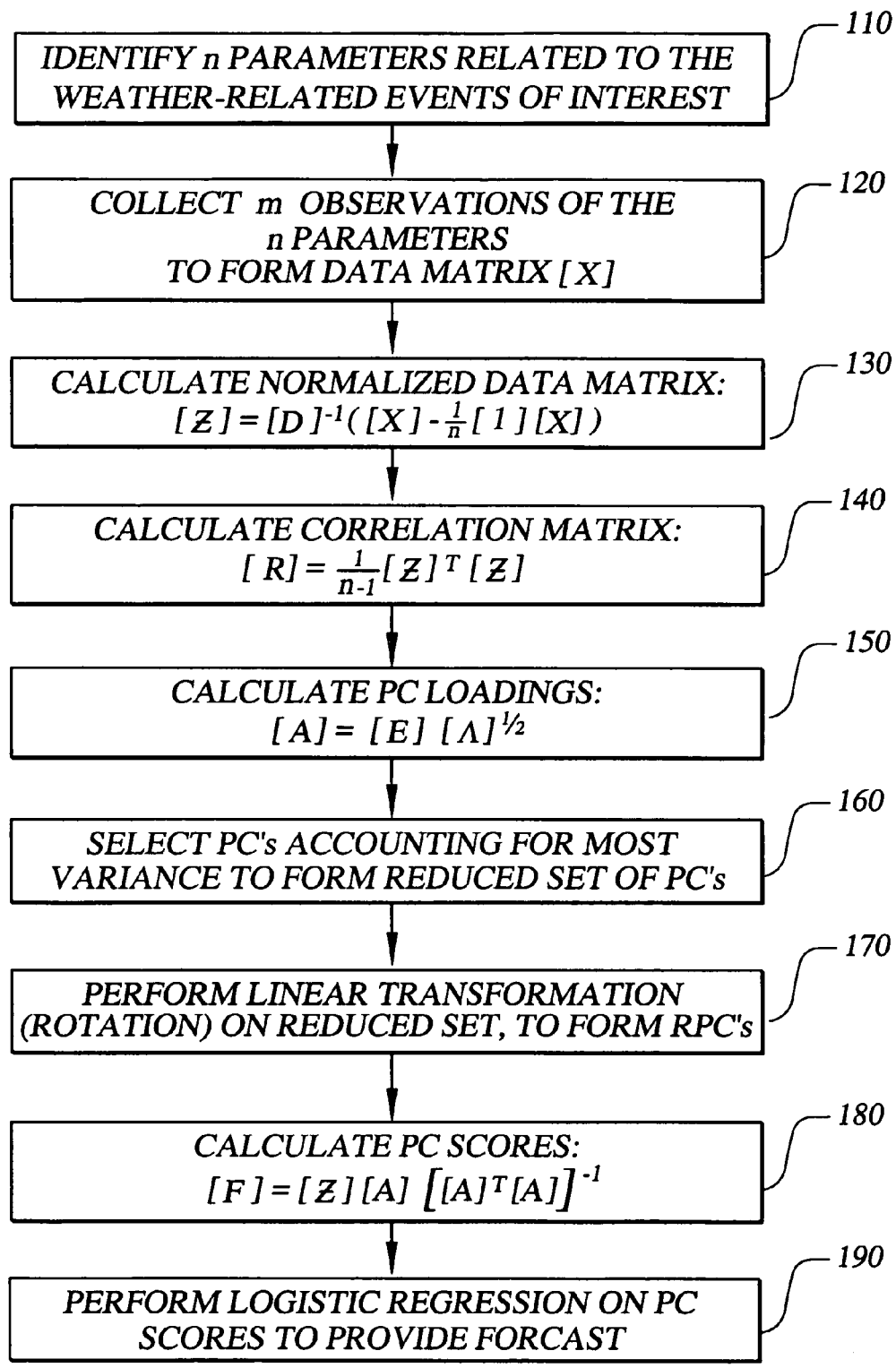
FIG. 1 is a diagram showing in detail the method of calculating a forecast probability for a selected weather-related event using the inventive method, according to an embodiment of the invention.

The following detailed description shows the best currently contemplated modes of carrying out the invention. The description is not to be taken in a limiting sense, but is made for the purpose of illustrating the general principles of the invention and the best mode for practicing the invention, since the scope of the invention is best defined by the appended claims.

The present invention defines methods, systems, and computer program products for a weather prediction system that will produce near-term probability forecasts of selected weather events for a specified area of interest. The invention employs the Perfect Prog methodology since it can be applied to different computer models at any forecast (or analysis) time and can be applied even as the models change. This advantageous feature makes the invention generically applicable to a large number of models.

The invention employs a multivariate statistical method known as Principal Components Analysis, or PCA, to essentially compress the data so that it may be more easily worked with. The atmospheric sciences have employed PCA in the prior art to reduce data sets containing large numbers of variables to a smaller set of variables called principal components (PC), which still represents a large fraction of the variability contained in the original data set. However, PCA can achieve this reduction only if there is substantial correlation, or covariance, between the original variables. Each of the PCs has the property as a group of being uncorrelated.

In addition to data compression, the PCs can also provide a better physical interpretation of atmospheric processes and can yield substantial insights into both the spatial and temporal variations of the fields being analyzed. However, each PC may represent a combination of several processes. In order to relate the PCs back to measurable variables in the original data set, the invention provides an inventive procedure of applying a linear transformation, or "rotation", to the reduced set of PCs to provide a corresponding set of rotated PCs, or RPCs. Even though the original variables in the observed data set may be correlated, these RPCs retain all of the variability in the reduced set of unrotated PCs, but are uncorrelated if an orthogonal rotation is used; uncorrelated variables are a normal result of such a coordinate transformation. Often in multiple regression, predictor variables exhibit very large mutual correlations. The result is that the forecasting equation may perform very badly with this method. Because the PCs are uncorrelated, there is no multi collinearity. Therefore, the regression coefficients will be estimated with much better precision.

While the PCA is extremely powerful for data compression and can yield substantial insights into both the spatial and temporal variation of the fields being analyzed, the linear transformation ("rotation") may be applied to assure the PCs correspond to a single physical process and do not reflect mixed processes. One of the properties of the PCA method is that the eigenvectors of symmetric matrices are perpendicular (orthogonal) to each other. According to the PCA method, the eigenvectors calculated from a symmetric data matrix serve to define an alternative coordinate system to view the data. However, the orthogonality property of the eigenvectors can cause problems with their interpretation. This new (rotated) coordinate system may be oriented such that each new axis may be aligned along the direction of the maximum joint variability of the data, consistent with that axis being orthogonal to the preceding axes. The first eigenvector may be the vector associated with the largest eigenvalue and is aligned parallel to the direction in which the data jointly exhibit maximum variation. While the first PC may represent an important atmospheric process, the maximal variance property of the PCA method makes it likely that other distinct atmospheric processes are also combined and mixed in with the first principal component or distributed across a number of other PCs.

Since one purpose of the PCA method is to gain a better physical interpretation of the atmospheric processes leading to the atmospheric phenomenon being examined, e.g. thunderstorms in the Western United States, it is desirable to apply the linear transformation (i.e. a varimax orthogonal rotation) to a subset of the original PCs, in order to form a new set of rotated PCs (RPCs). An advantage of applying the varimax orthogonal rotation is that the RPCs are physically consistent with subsets of the original data variables that coincide with specific atmospheric processes. In other words, the RPCs support the observed correlation between the original variables. Hence, the RPCs may provide a better understanding of the physical basis for the atmospheric process being studied.

Suppose, for example, we were to assume (perhaps erroneously) that we had devised "the perfect set of predictors", where each predictor represented a distinct physical process in the atmosphere and each of the predictors was uncorrelated and independent. The PCA method might independently confirm or disprove the original predictor assumptions. Even if the underlying physical processes leading to the phenomenon being studied (such as how thunderstorms form) was not known or understood in advance, the RPCA method would be able to take a large set of predictors and assign them to a much smaller set of rotated vectors that could best describe the elemental atmospheric variables.

The statistical calculations performed herein in support of the invention may be provided by any suitable statistical software package having PCA and logistic regression capabilities. The PCA techniques used in developing the results for the invention may be found in statistical software packages such as S-Plus 2000, which is available from Insightful Corporation (previously, MathSoft, Inc.), 1700 Westlake Avenue North, Seattle, Wash.) (1999). Another statistical software package containing routines useful for calculating portions of the inventive method may be the GEMPAK software, which was developed under government contract for use by the community of statistical users.

Referring now to FIG. 1, a detailed procedure for the PCA method may now be described. Briefly, a set of parameters related to the weather-related event of interest is identified, according to the block labeled 110. A set of observations of these parameters is made at a set of geographical points over a period of time, according to the block labeled 120. An n×m data matrix may be developed from the n observations of the atmospheric variable of interest for a particular area, where the data matrix contains m data parameters and this data matrix is scaled, according to the block labeled 130.

A correlation matrix may then be computed from the scaled data matrix, according to the block labeled 140. The diagonal elements of the correlation matrix are the autocorrelations of each of the data parameters with themselves and are always equal to 1. Since correlation $r_{ij}$ between the i and j variables is the same as the correlation $r_{ji}$, then the correlation matrix will always be symmetric. The correlation matrix may be used rather than the covariance matrix, because the correlation matrix uses variance-normalized parameters, which assures that parameters with large differences in magnitude, such as potential vorticity ($10^{-6}$ m$^2$s$^{-1}$ Kkg$^{-1}$) and the 500 mb height field ($10^3$ meters), receive equal weight.

According to the block labeled 150, the eigvenvalues (scalar quantities) and eigenvectors (a set of nonzero vectors) may then be derived from the correlation matrix. Next, the individual elements, also called coefficients or PC loadings, of each of the eigenvectors may be computed and those eigenvectors contributing to the most variance may be retained, according to the block labeled 160. Mathematically, there are as many eigenvalues as there are data parameters. However, if all the eigenvalues ordered by descending magnitude, assigned an ascending index number, and plotted, then only the eigenvalues that retain the largest amount of variance from the original data need to be retained. These would be those values where the curve has the steepest slope. For example, as can be seen from the illustrative graph 200 in FIG. 2, the first 10 PCs 210 contain the most information. The first 10 PC loadings 220 are the most significant when viewed in light of the rate of change of the slope on FIG. 2, and they may constitute the reduced set of PCs of interest. This reduced set of PCs may then be rotated by applying a linear transformation to give rise to a new set of vectors called the rotated PCs (RPCs), according to the block labeled 170. Each of these RPCs contains all of the original quantities, and each vector can be defined by the largest absolute value coefficients.

The detailed steps for applying a PCA to the predictands are given in FIG. 1. The PCA may be initiated with the computation of the scaled data matrix [Z] (according to the block labeled 130) and the correlation matrix [R] (according to the block labeled 140) from the data matrix [X]={$x_{ij}$: i=1, ..., n; j=1, ..., m}, where n is the number of observations and m is the total number of parameters. The scaled data matrix [Z] may be computed from the original data matrix [X] according to the following equation:

$$[Z] = [D]^{-1}\left([X] - \frac{1}{n}[1][X]\right)$$

where $$\frac{1}{n}[1][X]$$

is the mean of [X], [1] is the matrix whose elements are all equal to unity, and [D]$^{-1}$ is the diagonal matrix whose elements are the reciprocals of the sample standard deviations of the m parameters on the diagonal of [D]. The correlation matrix [R] can be computed from the scaled data matrix [Z] by the following equation:

$$[R] = \frac{1}{n-1}[Z]^T[Z]$$

Correlation matrix [R] may be used rather than the variance-covariance matrix because of the large difference in the magnitudes of the m parameters. If the data were not scaled, that is, normalized to lie between 1 and −1, then the terms with the smaller variance might be incorrectly excluded. For example, because the variance of a set of 500 mb heights would normally be many times larger than the variance of a set of vertical velocity values, then the PCA covariance matrix might be dominated by the 500 mb heights.

The scaled data matrix [Z] may be related to the principal component scores [F] and the principal component loadings [A] by the following equation:

$$[Z]=[F][A]^T$$

Later, this equation may be rewritten to solve for the principal component scores [F]. These scores may serve as the predictors in the regression to be presently described, in place of the original m parameters.

In order to calculate the principal component scores, the principal component loadings [F] must first be computed. The principal component loadings, or weights, [A] may be computed according to the block labeled 150 from the eigenvector matrix [E] and the diagonal matrix [Λ], the elements of which are the descending eigenvalues, Λ of the correlation matrix [R], as follows:

$$[A]=[E][\Lambda]^{1/2}$$

The eigenvectors [E] and eigenvalues [Λ] may be calculated from the symmetric correlation matrix [R].

Next, the eigenvalues for all m parameters are examined according to the block labeled 160 to determine which parameters contribute the most variance. One method making this determination is to order all the eigenvalues by descending magnitude, plotting them on a graph, and using an empirical criterion for dividing the parameters into those that are significant and those that are not. One criterion might be to discard the remaining parameters when the difference between two successive eigenvalues is less than a given amount. Another criterion might be to examine the slope of the curve, as shown in the illustrative graph 200 of FIG. 2, and discard parameters to the right of the point where the slope approaches zero. At any rate, the PCs corresponding to the eigenvalues representing the greatest variance may be chosen for the reduced set of PCs.

The reduced set of p PCs may then be rotated by applying a linear transformation according to the block labeled 170 to give rise to a new set of vectors called the rotated PCs (RPCs). Each of these RPCs contains all of the original quantities, and each vector can be defined by the largest absolute value coefficients. A new matrix [A] may be formed which contains the p rotated PC loadings for the reduced set of PCs.

The PC model $[Z]=[F][A]^T$ can be rewritten to solve for the principal component scores [F] according to the block labeled 180, as follows:

$$[F]=[Z][A]([A]^T[A])^{-1}$$

The p PC scores computed from the scaled data matrix and the RPC's became the predictors for the logistic regression, according to the block lebeled 190. The principal component scores [F] used in the logistic regression may be computed from the scaled data matrix [Z] and the principal component loadings from the development matrix [A]. These scores may then be used in the logistic regression to develop and test the weather event probability forecasts.

Figure 6:
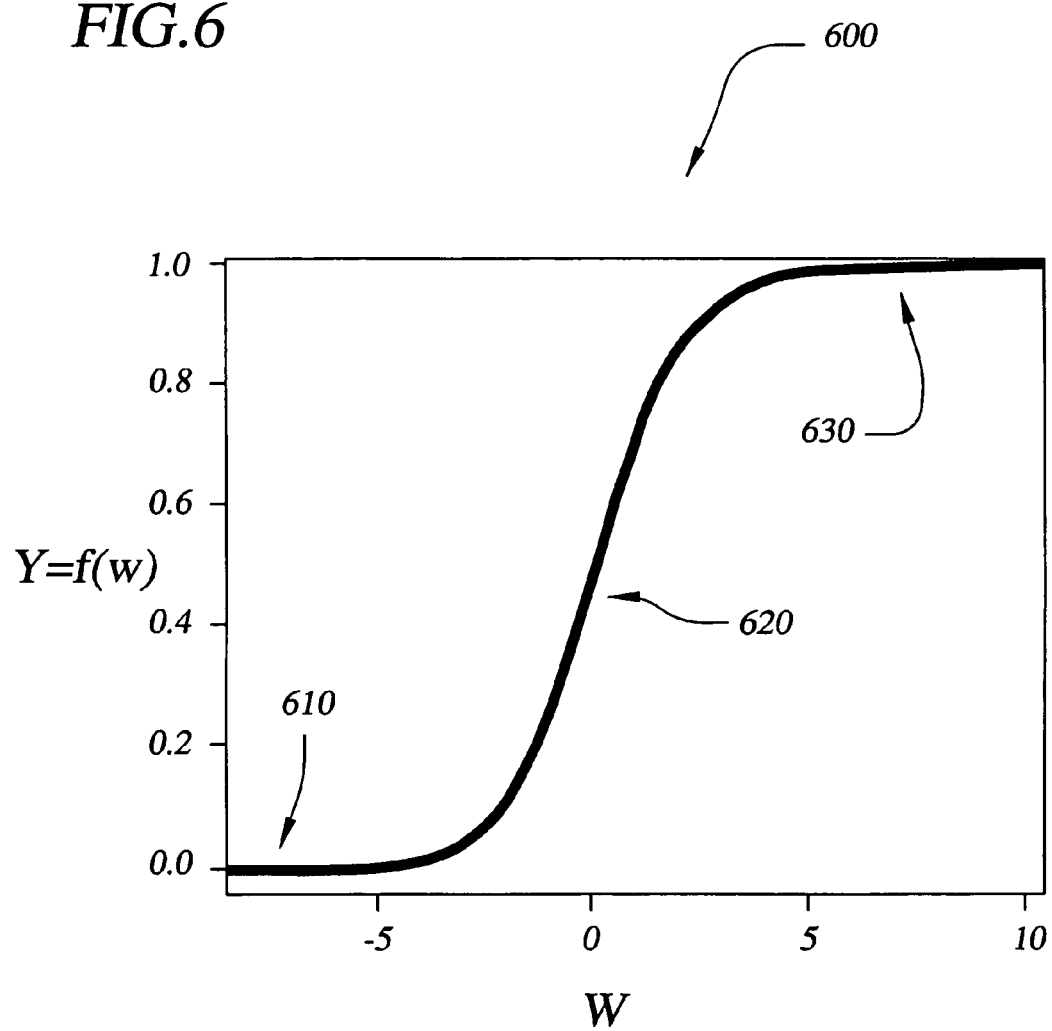
FIG. 6 is a diagram showing the response of a binary predictand f(W) calculated from a logistic regression W, according to an embodiment of the invention.

In order to derive a probabilistic forecast for a binary event, (i.e., lightning either does or does not occur, or four inches of rain either does or does not occur), the invention may use logistic regression to fit the RPCs to a non-linear equation having an exponential in the denominator. Referring now to FIG. 6, this regression method produces an S-shaped curve bounded by 0 and 1, which is suitable for results that are probabilities, as shown in graph 600. In addition to always producing a prediction between 0 and 1, the S-shaped curve of the logistic function, f(W), combines the contributions of the predictors and produces results that are slowly changing 610 for low values of w until a threshold is reached, then rises rapidly 620 for intermediate values of w and finally levels off 630 for high values of w. Historically, the parameters had to be estimated from an iterative technique that was computationally intensive, which limited its use in statistical weather forecasting. However, many statistical computer software packages now include logistic regression.

Logistic regression has as input a binary predictand having the value of 1 whenever the predictand is true and 0 when it is false. The PC scores ($S_i$ to $S_p$) provided by selecting the PCs that contain most of the variance are the predictands. A generalized linear model may be used to derive the predictive equation having the following form:

$$Y = e^{\frac{[W]}{1+e^{[W]}}}$$

where:

$$W = \beta_0 + \sum_{i=1}^{p} \beta_i S_i$$

The maximum likelihood estimates of the coefficients ($\beta_N$) are produced by an iteratively reweighted least squares approach. This common method is well known by those well versed in the field of statistics.

The inventive method may be best illustrated and explained by example. An embodiment of the invention will be described for applying the method to a particular weather related event, namely, forecasting the probability of lightning strikes occurring. The inventive method will be used to develop a prediction system that produces three-hour grid point probability forecasts of cloud-to-ground lightning for the western United States. It should be understood that this illustrative embodiment does not serve as a limitation of the method but to illustrate and explain the general concepts that have been described previously.

To fully appreciate the concepts and principles embodied by the invention as it is applied in this embodiment, a model may be established which describes the environment in which the method is applied. The features of this model may be dictated by the available data sets, the measurements that they represent, and the geographical areas to which they apply. It shall be necessary to define certain weather-related terms to better understand the particular data model and its assumptions. Some of these definitions and assumptions may be elemental to the field of meteorology, but are included for completeness.

A sounding may be defined as a plot of the vertical profile of temperature and dew point (and often winds) above a fixed location. Soundings are used extensively in severe weather forecasting, e.g., to determine instability, locate temperature inversions, measure the strength of the capping inversion, obtain the convective temperature, etc.

A cap (or capping inversion) may be defined as a layer of relatively warm air aloft (usually several thousand feet above the ground) which suppresses or delays the development of thunderstorms. Air parcels rising into this layer become cooler than the surrounding air, which inhibits their ability to rise further. The cap thus often prevents or delays thunderstorm development even in the presence of extreme atmospheric instability. However if the cap is removed or weakened, then explosive thunderstorm development can occur. A cap is an important ingredient in most severe thunderstorm episodes, as it serves to separate warm, moist air below and cooler, drier air above. With a cap, either the air below the cap can continue to warm and/or moisten or air above it can cool; either process increases potential instability. Without a cap, either process results in a rapid dissipation of the available instability, frequently before the severity of instability becomes large enough to support severe weather development.

The Level of Free Convection (LFC) may be defined as the level at which an air parcel lifted from the surface becomes positively buoyant. The Equilibrium Level (EL) is defined, for a sounding, as the level above the LFC at which the temperature of a rising air parcel again equals the temperature of the environment, i.e. the pressure at which a rising saturated air parcel encounters negative buoyancy; above that pressure, the air parcel is cooler than its surroundings. The height of the EL is the height at which thunderstorm updrafts no longer accelerate upward. Thus, to a close approximation, it represents the height of expected (or ongoing) thunderstorm tops. However, strong updrafts will continue to rise past the EL before stopping, resulting in storm tops that are higher than the EL. This process sometimes can be seen visually as an overshooting top or anvil dome. The default units for EL are millibars, abbreviated as mb.

Convective Available Potential Energy (CAPE) may be defined as a measure of the instability of the atmosphere, i.e. the amount of energy available for convection. It may be further regarded as the amount of energy available to a surface air parcel that has reached its LFC. It is an integrated measure of an air parcel's buoyant energy in units of joules per kilogram (J/kg). The CAPE is also defined mathematically as an integrated value of the positive energy, observed on a sounding, which is available to an air parcel as it freely rises between the LFC and the EL. The CAPE is therefore non-zero only if an LFC exists. CAPE is directly related to the maximum potential vertical speed within an updraft; thus, higher values indicate greater potential for severe weather. Observed values in thunderstorm environments often may exceed 1,000 J/kg, and in extreme cases may exceed 5,000 J/kg. However, as with other indices or indicators, there are no threshold values above which severe weather becomes imminent. CAPE is represented on a sounding by the area (often called "positive area") enclosed between the environmental temperature profile and the path of a rising air parcel, over the layer within which the latter is warmer than the former. Another terms related to CAPE are Most Unstable CAPE (MUCAPE), i.e. CAPE based on the most unstable air parcel in the lowest 300 mb, and normalized CAPE (NCAPE), i.e., CAPE divided by the depth of the CAPE with units of acceleration ($ms^{-2}$).

Convective Inhibition (CIN) may be defined as a measure of the amount of energy needed in order to initiate convection. Values of CIN typically reflect the strength of the cap. They are obtained on a sounding by computing the area enclosed between the environmental temperature profile and the path of a rising air parcel, over the layer within which the latter is cooler than the former (this area sometimes is called negative area.)

The data set chosen to illustrate this embodiment of the invention may consist of the hourly three-dimensional data sets generated by the RUC2 analysis as a basis for generating thunderstorm probability forecasts. The RUC2 has the advantage of rapidly incorporating all hourly surface data and any other off-time (i.e. non-radiosonde time) observations. Previous attempts to generate thunderstorm probabilities have had to rely on developmental data sets initialized only from the normal analysis times (00 to 12 UTC), and then the thunderstorm forecast became valid 6 to 12 hours after the analysis. Since the RUC2 is able to capture important changes (especially at the surface) on an hourly basis, this can translate into hourly updated model forecast parameters, which are important to the accurate prediction of thunderstorms.

The RUC2 model became operational in April 1998, and it marked the first time that a three-dimensional analysis was available on an hourly basis. The RUC2 data also contained the parameters necessary to evaluate the conditions needed for convection (pressure, temperature, moisture, and wind). The environmental model used for this embodiment may incorporate the physical processes that (1) initiate, (2) organize, (3) sustain, and/or (4) terminate convection by computing a large number of relevant diagnostic fields from the RUC2 data. In addition, a wide spectrum of diagnostic quantities may be calculated and evaluated at any desired level(s) in the atmosphere that might be physically related to thunderstorm genesis and maintenance. In addition to single level diagnostic quantities, other vertically averaged diagnostic quantities may be computed throughout the depth of the atmosphere.

Previous attempts at predicting lightning strikes have not taken into account a number of issues. First, past studies have used data that is tied just to the surface or an arbitrary level, such as the 850 millibar (mb) level or 700 mb level. This truncation for data collection at only certain arbitrary levels does not consider the effect of conditions at other significant levels, which may be particularly pertinent when thunderstorms or other hazardous weather are being dealt with.

Second, previous attempts, in an effort to simplify the calculations necessary and the observations to be taken, have not taken advantage of CAPE calculations. CAPE gives an indication of the instability of the atmosphere, so that the higher the CAPE value, the more unstable the atmosphere is. The RUC2 model provides values for CAPE on a regular basis. Also previous attempts have analyzed only the surface based CAPE, rather than the total Most Unstable CAPE (MUCAPE), i.e. CAPE based on the most unstable air parcel in the lowest 300 mb.

Third, the capping inversion has largely been ignored by prior efforts at lightning prediction, where the capping inversion is defined as a layer of relatively warm air aloft (usually several thousand feet above the ground) that suppresses or delays the development of thunderstorms. The presence of a strong capping inversion has a marked suppressing influence on thunderstorm development. Three diagnostic measures are used to identify and represent the strength of the capping inversion, i.e. the Convective Inhibition (CIN, as measured in $J kg^{-1}$ or $m^2 s^{-2}$), the Normalized CIN (CIN divided by the depth of the CIN and measured in $ms^2$), and the strength of the capping inversion (measured in degrees C.). There has been little progress in bridging the temporal gap between observations and analyses and the first time period when model data is valid (usually 3 to 6 hours after the start of any model forecast). The MOS system represents a statistical system that cannot change as the model itself improves. This invention may employ a Perfect Prog approach and represent a statistical system not tied to any model; it can thus continue to be used as the model is improved. A reasonable expectation would be that as the model improves, so, in theory would the forecasts produced by this invention. A characteristic of the Perfect Prog methodology is that, as the forecast time period gets closer to the model run time, the forecasts should continue to improve.

Forecasters have become more skilled in being able to predict the probability that a thunderstorm will become severe given that the thunderstorm develops. However, the most difficult part of the forecast often is to predict the probability of thunderstorms developing in the first place.

Use of the environmental model described for this embodiment may have several important advantages. First, in deriving probabilities for every three-hour period, different processes that may dominate during different time periods may be identified and highlighted. By deriving separate equations for each three-hour period, each of the equations may be more likely to capture this difference. For example, such differences might be daytime versus nocturnal storms or early afternoon development versus early evening decay of storms. Second, while some predictors (i.e. variables or data parameters) may be active through all eight of the three-hour periods, it is not reasonable to expect all terms to be acting in the same way throughout the course of any 24-hour period. Further, this environmental model may account for the influences of various terrain features in the area being studied by incorporating a set of time-dependent lightning climatological predictors developed especially for the model for each area of interest. It also may incorporate many new quantities that take into account the forcing mechanisms for thunderstorms throughout the depth of the atmosphere.

The present embodiment illustrating the invention uses lightning climatological predictors that are determined for the eight contiguous three-hour periods in a day and are updated every five days by using an average derived for each five day period, or pentads. These predictors include the average number of flashes, relative frequency (or probability) of one or more flashes, average percentage of flashes over all grid boxes that occurred in each box, and average percentage of the three-hour interval that lightning is observed (i.e. the number of 15 minute intervals with lightning divided by 12). No current thunderstorm predictive system has a lightning climatology comprised of three-hour climatologies per five-day (pentad) period.

The geographical area of interest may be divided up into rectangular grid boxes within which 3-dimensional climatological observations may be taken. For example, predictive data obtained from the western United States may be measured according to grid boxes that are 40 km. on a side. The choice of dividing the area into grid boxes and the size of the grid boxes may be dictated by the data and the ease by which it may be analyzed. Other choices may used for developing a set of data points, such as, for example, using discrete locations at which measurements are taken, without departing from the scope of the invention.

The present embodiment of the invention uses a large number of predictors computed from a multitude of model levels (every 25 mb in the vertical). For example, the level of the most unstable air parcel below 500 mb is included. Although the AVN/MRF MOS equations have recently used the Surface Based Convective Available Potential Energy (SBCAPE), no other model based predictive system has used MUCAPE and Most Unstable air parcel Convective Inhibition (MUCIN) together as a fundamental component of its system for thunderstorm prediction. For example, the current thunderstorm probability forecasts available to NWS forecasters from the ETA model are based only on the Lifted Index from the ETA and do not take into account the capping inversion or any other instability parameters. When CAPE and CIN measurements are used together, then areas of positive CAPE can be eliminated simply because the capping inversion (as measured by the CIN) is too strong for convection to develop.

Total MUCAPE between 0° and −40° C. in the present embodiment is sub-divided into layers that are 5° C. thick based on the environmental temperature (e.g. 0° to −5° C., etc.) In addition, when there is positive CAPE, the lowest and highest layers are computed from the Level of Free Convection (LFC) to 0° C. and from −40° C. to the Equilibrium Level (EL), respectively. The CAPE in these layers is defined as Layer CAPE (LCAPE). These layers may be used to determine any relationship between them and the presence of lightning and the number of flashes. Also, the relationship of Normalized CAPE (NCAPE) (i.e., CAPE divided by the depth of the CAPE with units of acceleration $(ms^{-2})$) to lightning and storms with high numbers of flashes may be examined. The Best CAPE (BCAPE) and CIN may then computed from the air parcel with the "best", or larger, CAPE from either of (1) the mean mixing ratio and potential temperature in the lowest 50 mb or (2) an air parcel above the lowest 50 mb and below 500 mb. The BCAPE and CIN can give a better representation of the CAPE and CIN when there are unrealistically large surface moisture or superadiabatic layers near the surface and can also capture the contribution of warm, moist air above a frontal surface or nocturnal inversion.

Figure 3:
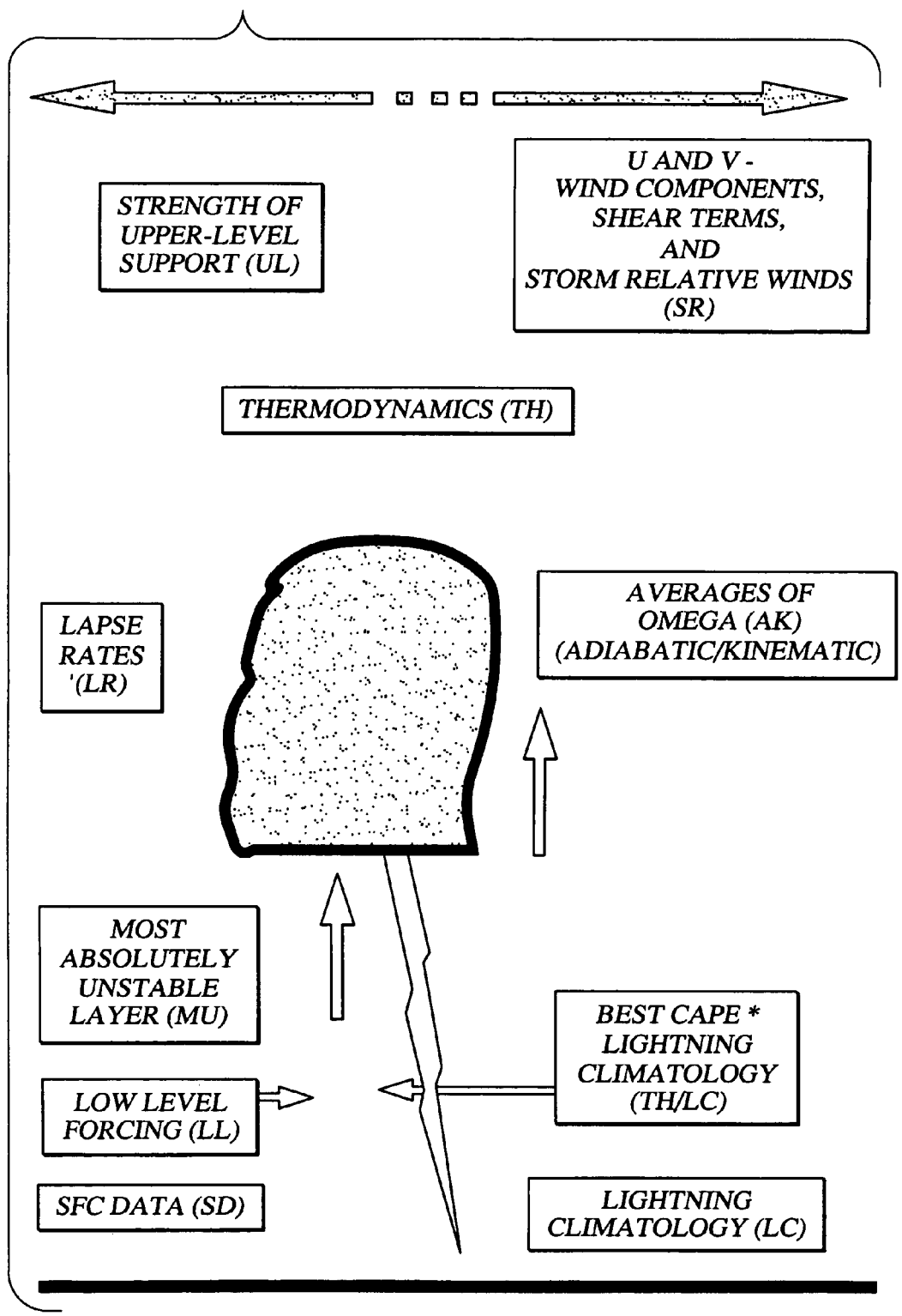
FIG. 3 is a diagram illustrating the approximate vertical level associated with different groups of data, according to an illustrative embodiment of the present invention.

Based upon the definitions given above and the availability of measurable and calculated data derived from the RUC2 data, Appendix A details a set of more than 200 predictors (parameters) of lightning-related weather phenomena that were derived from the RUC2 Model and used in the example illustrated by this illustrative embodiment. Other data and/or environmental models might have been used without departing from the scope of the invention or of this embodiment. Referring to FIG. 3, the data variables contained in the RUC2 model were classified for convenience of discussion according to the different vertical levels associated with each variable. Table 1 gives the definitions of the acronyms used in FIG. 3.

TABLE 1

Explanation of Data Categories in FIG. 3.

| Acronym | Definition |
| --- | --- |
| UL | Upper Level support |
| SR | Wind Shear terms and/or storm Relative winds |

TABLE 1-continued

Explanation of Data Categories in FIG. 3.

| Acronym | Definition |
| --- | --- |
| AK | Averages of vertical motion (Adiabatic/Kinematic) |
| TH | Thermodynamics |
| LC | Lightning Climatology |
| TH/LC | best CAPE (Thermodynamics* Lightning Climatology) |
| SD | Surface Data |
| LL | Lower-Level forcing |
| MU | Moist absolutely Unstable layer |
| LP | Lapse Rates |

Figure 4:
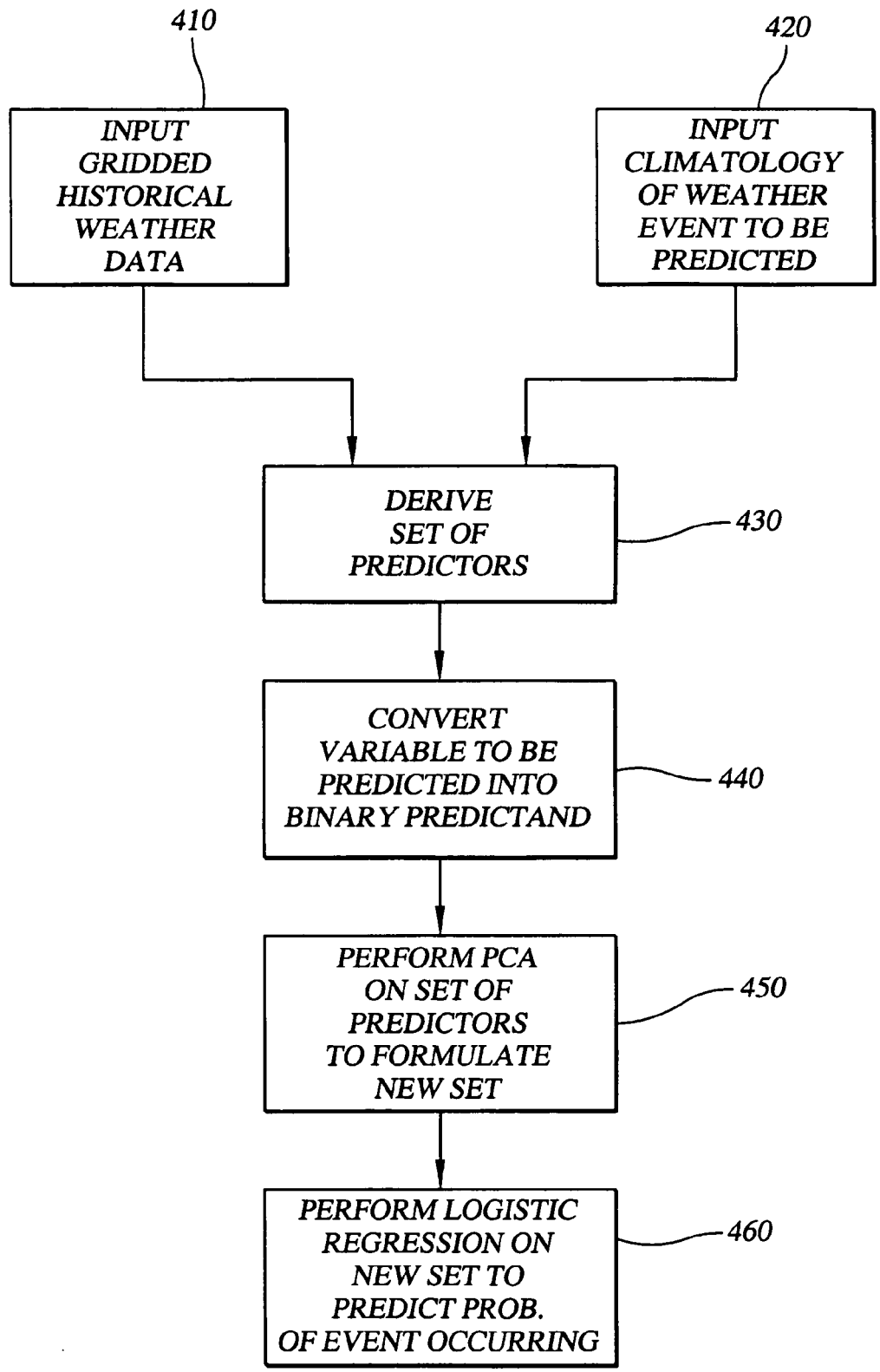
FIG. 4 is a flowchart of showing how the general weather prediction method may be applied when the weather-related event is lightning strikes, according to preferred embodiments of the present invention.

Referring to FIG. 4, a general flowchart is presented which illustrates the overall sequence of steps to be performed according to this embodiment. According to block 410, one input to the model consists of a set of gridded historical weather data that can be obtained from any computer model having a known resolution according to time and space. For example, the RUC2 model has a resolution of 40 km for its grid. Another input to the model, according to block 420, is a set of observations of the data parameters according to the same resolution as the gridded weather data. The inputs provided in blocks 410, 420 are used according to block 430 to derive a set of predictors believed to contribute to the selected weather event to be forecasted in a highly non-linear fashion. The variable to be predicted (as a probability) is converted according to block 440 into a binary predictand for forecasting purposes. For the present embodiment that forecasts the probability of lightning, one predictand may be whether or not one or more flashes occur, one predictand may be whether or not ten or more flashes occur, one predictand may be whether or not 100 or more flashes occur, and so forth. Given the desired predictands, a principal component analysis (PCA) is applied according to block 450 to the set of predictors derived in block 430 to derive a new set of predictors having a much smaller number of members. This new set of predictors may be used to account for a majority of the variance present in the original set of predictors. A linear transformation (rotation) is also performed to transform the new predictors into a unique set of physically as well as meteorologically significant predictors related to actual atmospheric processes and/or variables. For example, one output of the rotation is a predictor made up of all original instability measures. Another is a measure of average low-level forcing and integrated vertical velocities. Finally according to block 460, a logistic regression is applied to the new (rotated) set of predictors derived from the PCA in block 450 to derive the probability of the selected weather event occurring; this probability may now be calculated given a new gridded (independent) data set.

It is instructive to review some of the considerations that were made in determining the data model from which the predictive equations of the present embodiment were derived. The data model for this embodiment was developed as follows. The RUC2 and lightning data were derived from observations made in June, July, and August of 1999. A lightning climatology was developed separately, using the years 1995 to 1998. See Attachment 1 for a complete list of the parameter data set. Quantities for the period 00 to 03 UTC were used.

Although lightning in the West can be very active into early September, the lightning climatologies confirm that the months of June, July and August normally represent the most active months for thunderstorms. Finally, in interpreting the forecast probabilities, it is realized that lightning over a three-hour period in a grid box that is 40 by 40 km is likely to represent multiple thunderstorms. The forecast probabilities do not attempt to represent individual thunderstorms; rather, they may represent a group of storms within each grid box.

During the three months of June, July, and August 1999, a total of 70 days had both RUC2 and lightning data. Out of the 70 days, 54 days were used to develop the regression equations. Sixteen days were picked at random from contiguous pentads and withheld as independent data in order to test the equations. Since data from only one summer were available, the equations developed should be redeveloped when more data become available to improve the stability of the equations.

The original data matrix [X] was composed of 208 candidate predictors, or parameters, in the columns, and grid point data for all 54 days in the rows (i.e., 2530 grid points for 54 days, or 136,620 observations). Initially, the first statistical analyses were attempted using all 136,620 grid points, even those without CAPE. However, since the purpose of the example was to search for physical relationships between groups of predictors and lightning, only the grid points where the MUCAPE was present (greater than 0) and extended from the LFC to at least the −15 to −20° C. range were included in the final developmental matrix [X], which had 89,115 rows by 205 columns. Many of the predictors (Attachment 1) are only defined in the presence of CAPE, otherwise, default values had to be applied (e.g., LFC, EL, etc.) The CAPE computed from the Most Unstable Parcel (MUP) was used to represent an "upper-bound" for the CAPE calculations. In reality, the actual CAPE values of a rising parcel could be far less than the MUCAPE, since the air at the Most Unstable Parcel Level (MUPL) may not be representative of the air going into the updraft.

The layer CAPE from −15 to −20° C. was found to be a good discriminator between cases with CAPE and lightning and cases with CAPE and no lightning. In other words, when any amount of CAPE was present, in over 98 percent of the cases when lightning occurred, the CAPE extended to at least the layer from −15 to −20° C. Therefore, in order to concentrate on the cases where lightning was more likely (layer CAPE greater than zero from −15 to −20° C.), the rows of data with no CAPE in this layer were removed from the matrix, leaving 89,115 rows of data. This resulted in only 150 out of 13,523 grid boxes (1 percent) with one or more lightning flashes being discarded. However, 47,505 grid boxes (39 percent) without lightning were excluded from the analysis as a result of this condition.

All 208 candidate predictors were used in the analysis and predictive equation development. However, out of the original 208 candidate predictors, 205 candidate predictors were used in the PCA because the I, J, and K grid point locations were excluded, since these are fixed values with zero variance. The fundamental PCA method may be called an "R mode analysis" since an R mode is defined where the columns of the matrix are the predictors and station data (grid points in this case) are the rows. The PCA is termed a "Hybrid R mode" because a normal R mode analysis is for one time period and in this case 54 days are included in the rows.

Figure 2:
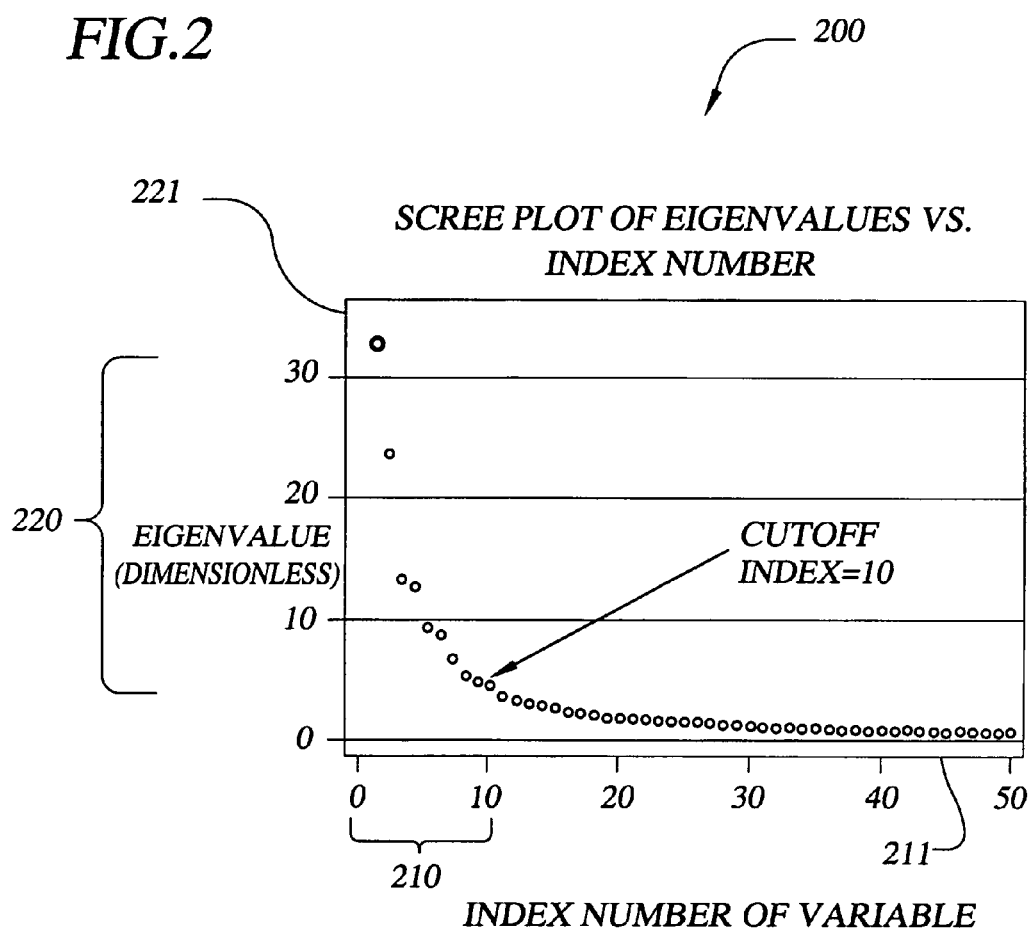
FIG. 2 is a plot of eigenvalues computed from the set of rotated Principal Components ordered by descending value.

A correlation matrix [R] (205×205) was computed from the scaled data matrix [Z] (89,115×205). The eigenvalues [Λ] and eigenvectors [E] of the correlation matrix were then calculated. The individual elements, also called coefficients or PC loadings, for each of these 205 eigenvectors were computed. Mathematically, there are as many eigenvectors as there are original parameters, if there are no linearly dependent variables. A plot of the eigenvalues illustrates graphically how the number of eigenvectors to be retained can be determined. The graph 200 given in FIG. 2, sometimes called a scree graph, orders the eigenvalues in descending magnitude along the Y-axis 221 corresponding to the PC index, along with its corresponding parameter, along the X-axis 211. Several methods exist to determine how many PC's should be retained, with the scree graph being one of these methods. A purpose of the scree graph is to separate the steeply sloping portion of the plot (containing the signal and some noise) from the portion where the slope is much less (containing primarily noise). As shown in FIG. 2, a rapid change in the slope appears in this case after the first ten eigenvalues 220. This would suggest that the ten parameters corresponding to the first ten PC indices 210 along the X-axis 211 account for most of the variability in the data. The goal of data reduction would therefore be achieved by reducing the number of variables from 205 to 10. However, if the procedure were to stop at this point, there is the possibility that different physical processes could be included in the first PC (since it explains the maximum variance), making a physical interpretation misleading. Such unrotated solutions may exhibit four characteristics that hamper their utility to isolate individual modes of variation. These four characteristics are as follows: (1) the inaccurate portrayal of the physical relationships embedded within the data input matrix, (2) the PC's dependence on the shape of the domain, and/or (3) the size of a smaller subdomain, and (4) inability to physically interpret the results even with large sample sizes.

Since one of the goals of the method is the physical interpretation of the underlying order, an orthogonal (varimax) rotation, or linear transformation, may be applied to the first 10 loadings. Tests were also conducted applying the rotation to the first 12, 14, and 16 PC's. Minimal differences were noted in the results, as the first 10 rotated PC loadings were nearly identical in each of the cases. Increasing the number of terms that were rotated from 10 to 16 accounted for minimal data compression (i.e. 58% of the original variance represented by the 10 terms versus 69% for 16 terms). Therefore, only ten terms were rotated since this was where a distinct "break" in the scree plot occurred and little additional variance was explained in terms 11 through 16. In addition to the varimax orthogonal rotation, two other transformations were attempted (oblique rotation (oblimin) and Procrustes) with no significant differences in the loadings.

The rotation of the leftmost 10 PC's shown in graph 200 of FIG. 2 may provide a new set of rotated vectors (RPCs). Each of these RPCs contains all of the original quantities and each vector can be defined by the largest (absolute value) coefficients. For the analysis of this embodiment, the coefficients with a value below 0.40 were not used because they contribute little information. The new RPCs and the percent of original variance explained are shown in Table 2. The scores computed from these RPC loadings were then used in the logistic regression.

TABLE 2

Individual RPCs from Orthogonal (Linear) Rotation

| Nr. | RPC Terms | Amt of Var contained from original data | Parameter |
|---|---|---|---|
| 1 | T | 13% | CAPE |
| 2 | T | 10% | Lapse rates/relative humidity |
| 3 | D | 6% | Upper-level potential vorticity, saturated and moist geostrophic potential vorticity (above 400 mb), tropopause pressure, temperature, 500 mb height, height of 0, −10, and −20° C., WBZ |
| 4 | D | 5% | Low level forcing and vertical velocity through LFC |
| 5 | D | 5% | U wind components, shear and storm relative terms |
| 6 | D | 5% | V wind components, shear and storm relative terms |
| 7 | D | 3% | Mid-level saturated geostrophic potential vorticity (below 400 mb), mid and low level cyclonic circulation |
| 8 | T | 4% | Convective Inhibition/Capping Inversion |
| 9 | T | 5% | Best CAPE*LTG Climo, LTG Climo, potential instability |
| 10 | D | 3% | Forcing from LCL to LFC, mid-level vertical velocity, upper-level divergence, pressure at most unstable parcel level |
|   |   | 59% total |   |

Figure 5:
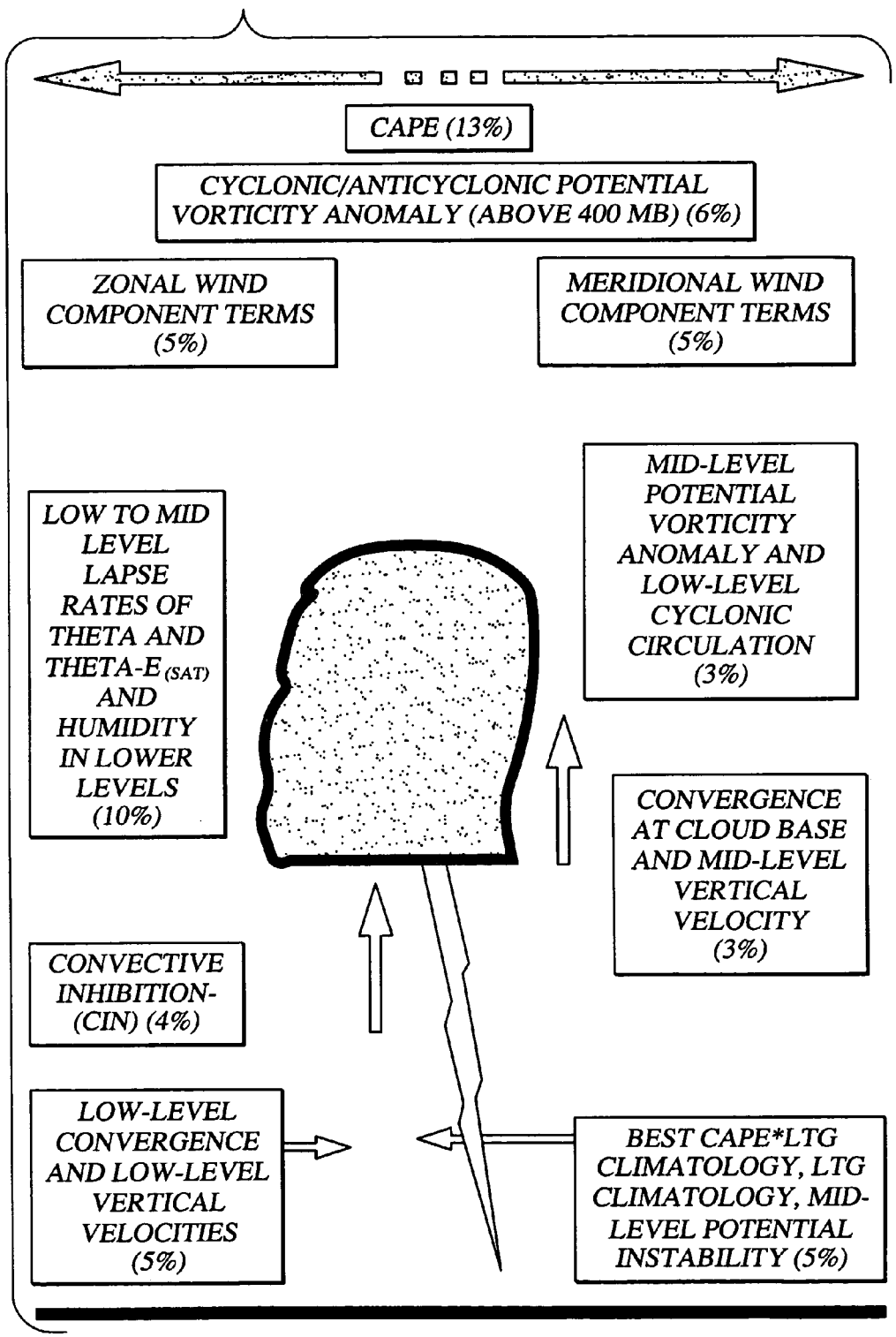
FIG. 5 is a diagram showing the ten RPC terms for lightning prediction and the percentage of the variance explained by each term, where the total variance from all predictors contained in the ten RPCs is 59%, according to preferred embodiments of the present invention.

Referring to FIG. 5, a set of predictors is shown according to the taxonomy given in FIG. 3 that has been calculated according to the method given in FIG. 4 for the occurrence of lightning strikes. In FIG. 5, the ten predictors selected according to the inventive method have been divided into the ten groups and the percentage of variance explained by each predictor. The total variance explained by all ten predictors accounts for 59% of the total.

The logistic regression for predicting the occurrence of lightning strikes according to this illustrative embodiment may have as input the binary predictand FONE, which is 1 for one or more flashes of lightning and 0 otherwise. The PC Scores computed from the PCA are the predictands and may then be calculated from the results of the previous process, where the developmental PC scores ($S_i$) correspond to the 10 RPCs shown in Table 2. The maximum likelihood estimates of the coefficients $\beta_i$ may be calculated by the iteratively reweighted least squares approach, and substituting in these coefficients derived from the logistic regression in the previous equation for W gives:

$$W = -2.24 + 0.37S_1 + 0.23S_2 + 0.28S_3 + 0.46S_4 0.28S_5 + 0.33S_6 - 0.01S_7 + 0.03S_8 + 0.86S_9 + 0.51S_{10}$$

As has been demonstrated the present invention provides advantageous techniques for a weather prediction system that will produce probability forecasts of at least an hour for selected weather events of interest. As will be appreciated by one of skill in the art, alternate embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

APPENDIX A

Set of Lightning Predictors Derived from the RUC2 Model

| Var # | GEMPAK Name | Description | Category |
|---|---|---|---|
| 1 | K | K-grid point | SD |
| 2 | I | West to east grid point | SD |
| 3 | J | South to north grid point | SD |
| 68 | LMSL | Laplacian of mean sea level pressure | SD |
| 69 | PTND | Sfc pressure (altimeter) change (3 hr.) | SD |
| 70 | LTND | Laplacian of sfc pressure change (3 hr.) | SD |
| 71 | LTHA | Laplacian of surface Theta | SD |
| 72 | PRES | Pressure at surface (altimeter based) | SD |
| 73 | ZMEG | Terrain upslope/downslope | SD |
| 74 | FRNT | Surface frontogenesis | SD |
| 75 | DQVC | Surface Q vector convergence | SD |
| 76 | PMSL | Mean sea level pressure | SD |
| 77 | RELH | Surface humidity | SD |
| 78 | MFCN | Surface moisture flux convergence | SD |
| 79 | WDIV | Surface wind divergence | SD |
| 80 | TWAD | Surface Theta-W advection | SD |
| 81 | RVRG | Surface relative vorticity | SD |
| 186 | LHGT | Laplacian of surface height field | SD |
| 187 | SMXR | Surface mixing ratio | SD |
| 198 | UWND | Surface U wind component | SD |
| 199 | VWND | Surface V wind component | SD |
| 4 | IOTF | LTG average number flashes | LC |

APPENDIX A-continued

Set of Lightning Predictors Derived from the RUC2 Model

| Var # | GEMPAK Name | Description | Category |
|---|---|---|---|
| 5 | ITFR | LTG spatial relative frequency | LC |
| 6 | IONE | ltg relative frequency | LC |
| 201 | ITSM | LTG climo-% of 3 hr pd ltg occurred | LC |
| 204 | BOTF | BECP*IOTF | TH/LC |
| 205 | BTFR | BECP*ITFR | TH/LC |
| 206 | BONE | BECP*IONE | TH/LC |
| 207 | BTSM | BECP*ITSM | TH/LC |
| 46 | FCRH | AVG humidity from LCL to LFC | LL |
| 64 | RHAV | AVG humidity from MUPL to LCL | LL |
| 105 | ASRH | AVG sub-cloud humidity | LL |
| 109 | MCAV | AVG moist flux convg (MUPL–LCL) | LL |
| 110 | WCAV | AVG wind divergence (MUPL–LCL) | LL |
| 111 | TCAV | AVG Theta-W advection (MUPL–LCL) | LL |
| 112 | RCAV | AVG geostrophic rel vort (MUPL–LCL) | LL |
| 113 | FCAV | AVG frontogenesis (MUPL–LCL) | LL |
| 114 | LCAV | AVG Theta Laplacian (MUPL–LCL) | LL |
| 115 | HCAV | AVG height (pressure sfc) (MUPL–LCL) | LL |
| 116 | QCAV | AVG Q vect convergence (MUPL–LCL) | LL |
| 117 | MFAV | AVG moist flux convg (LCL–LFC) | LL |
| 118 | WFAV | AVG wind divergence (LCL–LFC) | LL |
| 119 | TFAV | AVG theta-W advection (LCL–LFC) | LL |
| 120 | RFAV | AVG geostrophic rel vort (LCL–LFC) | LL |
| 121 | FFAV | Avg frontogenesis (LCL–LFC) | LL |
| 122 | LFAV | AVG Theta Laplacian (LCL–LFC) | LL |
| 123 | HFAV | AVG height Laplacian (LCL–LFC) | LL |
| 124 | QFAV | AVG Q vect convergence (LCL–LFC) | LL |
| 132 | AWLC | AVG ageostrophic wind (MUPL–LCL) | LL |
| 133 | AWLF | AVG ageostrophic wind (LCL to LFC) | LL |
| 134 | VUAV | Change-ageostrophic shear (LCL–400 mb) | LL |
| 135 | GUAV | Gradient vertical motion (LCL–400 mb) | LL |
| 136 | VLAV | Change-ageostrophic shear (LCL–LFC) | LL |
| 137 | GLAV | Gradient vertical motion (LCL to LFC) | LL |
| 188 | MXTE | Theta-E at MUPL | LL |
| 7 | MLIM | Most negative LI (MUP) from any level | TH |
| 8 | MLIO | Pressure level of MLIM | TH |
| 9 | MLIH | Height of MLIM | TH |
| 11 | MELP | Pressure of the EL using the MUP | TH |
| 12 | MELH | Height of the EL using the MUP | TH |
| 13 | MELT | Temperature (° C.) of the EL | TH |
| 14 | CDPM | Cloud depth (meters) from LCL to EL | TH |
| 15 | FCDP | Depth LCL to LFC (when LFC present) | TH |
| 16 | MLPP | Originating pressure level of MUP | TH |
| 17 | MBST | Lift (mb) for MUP to reach saturation | TH |
| 18 | MMPP | Pressure (mb) Max air Parcel Level (MPL) | TH |
| 19 | MMPH | Height (meters) of MPL | TH |
| 20 | NCAP | Normalized Most Unstable CAPE (m s$^{-2}$) | TH |
| 21 | BECP | Best CAPE-best-50 mb avg or level above | TH |
| 22 | BECN | Convective Inhibition (CIN) for BECP | TH |
| 23 | EMCP | Elevated most unstable CAPE above cap | TH |
| 24 | EMCN | CIN for EMCP | TH |
| 25 | UUCP | Unstable and uncapped CAPE | TH |
| 26 | MUCP | Most Unstable CAPE (MUCAPE) | TH |
| 27 | MUCN | CIN-most unstable CAPE (MUCAPE) | TH |
| 28 | MULI | LI for most unstable air parcel at 500 mb | TH |
| 29 | MLF0 | Layer CAPE (LFC to 0° C.) | TH |
| 30 | MM05 | Layer CAPE (0 to –5° C.) | TH |
| 31 | MM10 | Layer CAPE (–5 to –10° C.) | TH |
| 32 | MM15 | Layer Cape (–10 to –15° C.) | TH |
| 33 | MM20 | Layer CAPE (–15 to –20° C.) | TH |
| 34 | MM25 | Layer CAPE (–20 to –25° C.) | TH |
| 35 | MM30 | Layer CAPE (–25 to –30° C.) | TH |
| 36 | MM35 | Layer CAPE (–30 to –35° C.) | TH |
| 37 | MM40 | Layer CAPE (–35 to –40° C.) | TH |
| 38 | MM4E | Layer CAPE (–40° C. to EL) | TH |
| 39 | MLCT | Cloud base (LCL) temperature (° C.) | TH |
| 40 | MH10 | Height (meters–MSL) of –10° C. | TH |
| 43 | MH20 | Height (meters–MSL) of –20° C. | TH |
| 50 | MUCF | Most unstable CAPE from LCL to LFC | TH |
| 53 | MCAP | Capping inversion for MUP (° C.) | TH |
| 54 | LMCN | Laplacian of CIN | TH |
| 55 | EFDF | Diff(meters) EL to freezing level | TH |
| 56 | EWDF | Diff(meters) EL to wet-bulb zero | TH |
| 57 | WBZH | Height of wet-bulb zero (meters–MSL) | TH |
| 58 | FZLH | Height of freezing level (meters–MSL) | TH |
| 59 | DNCP | Downdraft CAPE (J/kg) | TH |
| 60 | TEDF | Theta-E difference mid-loevels to sfc | TH |
| 61 | MXMX | Mixing ratio for MUP | TH |
| 62 | QTRN | MXMX*storm rel inflow at MUPL | TH |
| 63 | XTRN | MXMX*wind speed at MUPL | TH |
| 82 | MLCH | Cloud base height (meters–msl) for MUP | TH |
| 83 | MLFH | Height of LFC for MUP | TH |
| 106 | INPW | Inches of precipitable water | TH |
| 189 | MULP | Laplacian of moist unstable CAPE | TH |
| 190 | THEL | Laplacian of Theta-E from MUPL | TH |
| 191 | TRPK | Temp (° K.) at tropopause ("2 PV" units) | TH |
| 192 | TRPT | Isentropic surface (° K.) of tropopause | TH |
| 195 | MCNP | Pressure level of capping inversion | TH |
| 196 | MLCP | Pressure level of LCL for MUP | TH |
| 197 | MLFP | Pressure level of LFC for MUP | TH |
| 200 | NCIN | Normalized CIN (m/s$^2$) | TH |
| 202 | CTOT | Layer CAPE from LFC to –20° C. | TH |
| 203 | CZ20 | Layer CAPE from 0 to –20° C. | TH |
| 208 | BMCR | Ratio BECP to MUCP (0 if MUCP = 0) | TH |
| 41 | ELSU | U shear component from EL to LCL | SR |
| 42 | ELSV | V shear component from EL to LCL | SR |
| 44 | FCSU | U shear component from LCL to LFC | SR |
| 45 | FCSV | V shear component from LCL to LFC | SR |
| 84 | UPMW | Sfc to 6 km pressure-weighted U comp | SR |
| 85 | VPMW | Sfc to 6 km pressure-weighted V comp | SR |
| 86 | UCBL | Cloud-bearing layer U mean wind comp | SR |
| 87 | VCBL | Cloud-bearing layer V mean wind comp | SR |
| 88 | U3SV | Surface to 3 km U shear component | SR |
| 89 | V3SV | Surface to 3 km V shear component | SR |
| 90 | U6SV | Surface to 6 km U shear component | SR |
| 91 | V6SV | Surface to 6 km V shear component | SR |
| 92 | ULSV | Low level to 6 km U shear component | SR |
| 93 | VLSV | Low level to 6 km V shear component | SR |
| 94 | BRNS | Bulk Richardson Number Shear (m$^2$/s$^2$) | SR |
| 95 | USSR | Surface to 2 km storm rel. U wind comp | SR |
| 96 | VSSR | Surface to 2 km storm rel. V wind comp | SR |
| 97 | U4SR | 4 to 6 km storm rel U wind comp | SR |
| 98 | V4SR | 4 to 6 km storm rel V wind comp | SR |
| 99 | U9SR | 9 to 11 km storm rel U wind comp | SR |
| 100 | V9SR | 9 to 11 km storm rel V wind comp | SR |
| 101 | UASR | Anvil level storm rel U wind comp | SR |
| 102 | VASR | Anvil level storm rel V wind comp | SR |
| 103 | UMXP | U wind component at MUPL | SR |
| 104 | VMXP | V wind component at MUPL | SR |
| 125 | INFL | Storm relative inflow (magnitude) | SR |
| 126 | OTFL | Storm relative outflow (magnitude) | SR |
| 179 | SH38 | 300 to 850 mb speed shear | SR |
| 48 | VKCL | Kinematic vertical velocity at LFC | AK |
| 49 | VVCL | Adiabatic vertical velocity at LCL | AK |
| 51 | VKFL | Kinematic vertical velocity at LFC | AK |
| 52 | VVFL | Adiabatic vertical velocity at LFC | AK |
| 108 | VVAV | AVG adiabatic vert vel (LCL–400 mb) | AK |
| 127 | VVLC | AVG adiabatic vert vel (MUPL–LCL) | AK |
| 128 | VKLC | AVG kinematic vert vel (MUPL–LCL) | AK |
| 129 | VVLF | AFG adiabatic vert vel (LCL–LFC) | AK |
| 130 | VKLF | AVG kinematic vert vel (LCL–LFC) | AK |
| 131 | VKAV | AVG kinematic vert vel (LCL–400 mb) | AK |
| 66 | TELP | Moist Absolutely Unstable Layer | MU |
| 67 | MMBD | Depth of MAUL (mb) | MU |
| 47 | FCTL | Theta difference MUPL to LFC | LR |
| 65 | THLA | Theta difference from MUPL to LCL | LR |
| 107 | LLLR | Lower level lapse rate-sfc to 3 km | LR |
| 138 | LP78 | Theta-change/press diff 700 to 850 mb | LR |
| 139 | LC78 | LP78*AVG converg 700 to 850 mb | LR |
| 140 | SL78 | Sat Theta-E/press diff 700 to 850 mb | LR |
| 141 | ML78 | Theta-E/pressure diff 700 to 850 mb | LR |
| 144 | LP67 | Theta-change/press diff 600 to 700 mb | LR |
| 145 | LC67 | LP67*AVG converg 600 to 700 mb | LR |
| 146 | SL67 | Sat Theta-E/press diff 600–700 mb | LR |
| 147 | ML67 | Theta-E/press diff 600 to 700 mb | LR |
| 152 | LP56 | Theta-change/press diff 500 to 600 mb | LR |
| 153 | LC56 | LP56*AVG converg 500 to 600 mb | LR |
| 154 | SL56 | Sat Theta-E/press diff 500–600 mb | LR |
| 155 | ML56 | Theta-E/press diff 500 to 600 mb | LR |

APPENDIX A-continued

Set of Lightning Predictors Derived from the RUC2 Model

| Var # | GEMPAK Name | Description | Category |
|---|---|---|---|
| 158 | TL75 | Temperature diff-700 to 500 mb (° C.) | LR |
| 159 | LPS4 | Theta-change/press diff 400 mb to sfc | LR |
| 160 | LP48 | Theta-change/press diff 400 mb to 850 mb | LR |
| 161 | LP47 | Theta-change/press diff 400 to 700 mb | LR |
| 162 | LP45 | Theta-change/press diff 400 to 500 mb | LR |
| 163 | LC47 | LP56*AVG converg 500 to 600 mb | LR |
| 164 | LC45 | LP45*AVG converg 400 to 500 mb | LR |
| 165 | SLS4 | Sat Theta-E/press diff 400 mb to sfc | LR |
| 166 | SL48 | Sat Theta-E/press diff 400 mb to 850 mb | LR |
| 167 | SL47 | Sat Theta-E/press diff 400 to 700 mb | LR |
| 168 | SL45 | Sat Theta-E/press diff 400 to 500 mb | LR |
| 169 | MLS4 | Theta-E/press diff 400 mb to sfc | LR |
| 170 | ML48 | Theta-E/press diff 400 mb to 800 mb | LR |
| 171 | ML47 | Theta-E/press diff 400 mb to 700 mb | LR |
| 172 | ML45 | Theta-E/press diff 400 mb to 500 mb | LR |
| 173 | SP45 | Sat Geostrophic PV-400 to 500 mb | LR |
| 174 | MP45 | Moist Geostrophic PV-400 to 500 mb | LR |
| 175 | SP34 | Sat Geostrophic PV-300 to 400 mb | LR |
| 176 | MP34 | Moist Geostrophic PV-300 to 400 mb | LR |
| 10 | TRPP | Tropopause (as defined by 2 PV units) | UL |
| 142 | SP78 | Sat Geostrophic PV-700 to 850 mb | UL |
| 143 | MP78 | Moist Geostrophic PV-700 to 850 mb | UL |
| 148 | SP67 | Sat Geostrophic PV-600 to 700 mb | UL |
| 149 | MP67 | Moist Geostrophic PV-600 to 700 mb | UL |
| 150 | H5HT | 500 mb height field (meters) | UL |
| 151 | H5LP | Laplacian of 500 mb height field | UL |
| 156 | SP56 | Sat Geostrophic PV-500 to 600 mb | UL |
| 157 | MP56 | Moist Geostrophic PV-500 to 600 mb | UL |
| 177 | UREL | 300 mb U wind component | UL |
| 178 | VREL | 300 mb V wind component | UL |
| 180 | AUDV | AVG upr-lvl divergence (250 to 400 mb) | UL |
| 181 | AUAW | Mag ageostrophic wind (250 to 400 mb) | UL |
| 182 | PVOR | Potential vorticity (PV) (250 to 400 mb) | UL |
| 183 | PVAV | PV advection by 300 mb wind | UL |
| 184 | SP23 | Sat Geostrophic PV 200 to 300 mb | UL |
| 185 | MP23 | Moist Geostrophic PV 200 to 300 mb | UL |
| 193 | TRPU | U wind component at tropopause level | UL |
| 194 | TRPV | V wind component at tropopause level | UL |

We claim:

1. A method of predicting the occurrence of a selected weather event, the method comprising the steps of:
   identifying a first set of parameters that relate to the selected weather event, wherein the parameters in the first set are statistically correlated;
   identifying a data set comprised of a plurality of observations for the weather event over a selected geographical area, each observation containing values for the parameters;
   performing a Principal Component Analysis (PCA) to identify and select a reduced set of principal components corresponding to a second set of parameters, the reduced set of principal components being uncorrelated, the second set of parameters being a subset of the first set of parameters, the parameters in the second set of parameters contributing at least a majority of the variance of the first set of parameters;
   rotating the reduced set of principal components to provide a third set of parameters, wherein each parameter corresponds to a physical data measurement; and
   performing a logistic regression on the third set of parameters to determine the predictive equation for forecasting of the selected weather event.

2. The method of claim 1, wherein the step of rotating the second set of parameters is accomplished by a linear transformation.

3. The method of claim 1, wherein the step of identifying the data set of observations comprises the formation of a data matrix [X] having n rows and m columns, each row representing the i-th observation and each column representing the j-th parameter, where i is an index from 1 to n and j is an index from 1 to m.

4. The method of claim 3, wherein the step of performing the Principal Component Analysis (PCA) further comprises the step of
   calculating a scaled data matrix [Z] according to the following equation:

$$[Z] = [D]^{-1}\left([X] - \frac{1}{n}[1][X]\right)$$

where $$\frac{1}{n}[1][X]$$

is the mean of [X], [1] is the unity matrix whose elements are all equal to unity, and $[D]^{-1}$ is the diagonal matrix with diagonal elements being the reciprocals of the sample standard deviations of the m parameters and the remaining element being 0,
   whereby scaling the data allows parameters with different magnitudes of variance to be equally considered.

5. The method of claim 4, wherein the step of performing the Principal Component Analysis (PCA) further comprises the step of
   calculating a correlation matrix [R] from the scaled data matrix [Z] according to the following equation:

$$[R] = \frac{1}{n-1}[Z]^T[Z].$$

6. The method of claim 5, wherein the step of performing the Principal Component Analysis (PCA) further comprises the step of
   calculating an eigenvector matrix [E] and an eigenvalue matrix [Λ], both of which are derived from the correlation matrix [R].

7. The method of claim 6, wherein the step of performing the Principal Component Analysis (PCA) further comprises the step of
   calculating an PC loading matrix [A] according to the following equation:

$$[A] = [E][\Lambda]^{1/2}$$

8. The method of claim 7, wherein the step of performing the Principal Component Analysis (PCA) further comprises the step of
   ordering the parameters by descending values of the eigenvalues calculated for each parameter; and
   selecting the p parameters that account for at least a majority of the variance observed in the observations.

9. The method of claim 8, wherein selecting the p parameters is accomplished by plotting the parameters in descending order on a graph and selecting those parameters that are to the left of where the slope of the graph of the parameters approaches a selected distance from 0.

10. The method of claim 1, wherein the definition of the geographical area comprises a regular grid.

11. The method of claim 1, wherein the definition of the geographical area comprises a set of discrete points.

12. The method of claim 1, wherein the predictive equation for forecasting of the selected weather event provides a probability of a binary event.

13. A system for forecasting the probability of occurrence of a selected weather event, the system comprising:
   selecting a geographical area, the geographical area being divided into a regular grid;
   developing predictors for observed values of atmospheric phenomena within the geographical area;
   collecting a plurality of observations of the predictors for each portion of the grid over a period of time;
   forming a data matrix [X] having n rows and m columns, each row representing the i-th observation and each column representing the j-th parameter, where i is an index from 1 to n and j is an index from 1 to m;
   normalizing the data within the data matrix to provide a scaled data matrix [Z], wherein parameters having different magnitudes of variance may be equally weighted;
   calculating a correlation matrix [R] from the scaled data matrix [Z];
   calculating an eigenvector matrix [E] containing eigenvectors calculated from the correlation matrix [R] and an eigenvalue matrix [Λ] containing eigenvalues calculated from the respective eigenvectors, wherein the eigenvector matrix [E] provides a set of orthogonal vectors relating to variance;
   calculating a PC loadings matrix [A] from the eigenvector matrix [E] and the eigenvalue matrix [Λ];
   calculating the PC score matrix [F] from the scaled data matrix [Z] and the PC loadings matrix [A]; and,
   performing a logistic regression using the PC score matrix [F] to provide a probability for the occurrence of the selected weather-related event.

14. The system of claim 13, further comprising:
   forming a reduced set of eigenvectors, wherein the eigenvectors in the reduced set correspond to parameters that account for at least a majority of the total variance of the parameters in the data set;
   performing an orthogonal linear transformation on the reduced set of eigenvectors for form a rotated set of eigenvectors; and,
   calculating the PC loadings matrix [A] calculated from an eigenvector matrix [E] consisting of the rotated set of eigenvectors and an eigenvalue matrix [Λ] consisting of the eigenvalues corresponding to the rotated set of eigenvectors.

15. A computer program product for forecasting the occurrence of a weather event, the computer program product embodied on one or more computer-readable media and comprising:
   computer-readable program code means for input of a data set comprised of observations of data parameters made during a known time period at geographical sites;
   computer-readable program code means for performing a Principal Component Analysis (PCA) to identify and select a reduced set of principal components corresponding to a subset of the data parameters, the reduced set of principal components being uncorrelated, the parameters in the subset of parameters contributing at least a majority of the variance of all the parameters;
   computer-readable program code means for performing a logistic regression to determine the predictive equations for forecasting the occurrence of the selected weather event.

16. The computer program product described in claim 15, wherein the computer-readable program code means for performing a Principal Component Analysis (PCA) comprises
   a means for forming a data matrix [X] having n rows and m columns, each row representing the i-th observation and each column representing the j-th parameter, where i is an index from 1 to n and j is an index from 1 to m;
   a means for normalizing the data within the data matrix to provide a scaled data matrix [Z], wherein parameters having different magnitudes of variance may be equally weighted;
   a means for calculating a correlation matrix [R] from the scaled data matrix [Z];
   a means for calculating an eigenvector matrix [E] containing a first set of eigenvectors calculated from the correlation matrix [R] and an first eigenvalue matrix [Λ] containing eigenvalues calculated from the respective eigenvectors, wherein the eigenvector matrix [E] provides a set of orthogonal vectors relating to variance;
   a means for identifying an eigenvector matrix [E] consisting of a second set of eigenvectors corresponding to parameters that account for at least a majority of the total variance of the parameters in the data set;
   a means for performing an orthogonal linear transformation on the second set of eigenvectors for form a rotated set of eigenvectors; and,
   a means for calculating a PC loadings matrix [A] from the eigenvector matrix [E] consisting of the rotated set of eigenvectors and the eigenvalue matrix [Λ] consisting of the eigenvalues corresponding to the rotated set of eigenvectors;
   a means for calculating a PC loadings matrix [A] from the eigenvector matrix [E] and the eigenvalue matrix [Λ] corresponding to the rotated set of eigenvectors; and,
   a means for calculating the PC score matrix [F] from the scaled data matrix [Z] and the PC loadings matrix [A], the PC score matrix [F] provided as input to the logistic regression.

* * * * *